May 13, 1952      D. B. KENDALL      2,596,900
ELECTRICAL RELAY SYSTEM
Filed July 9, 1948
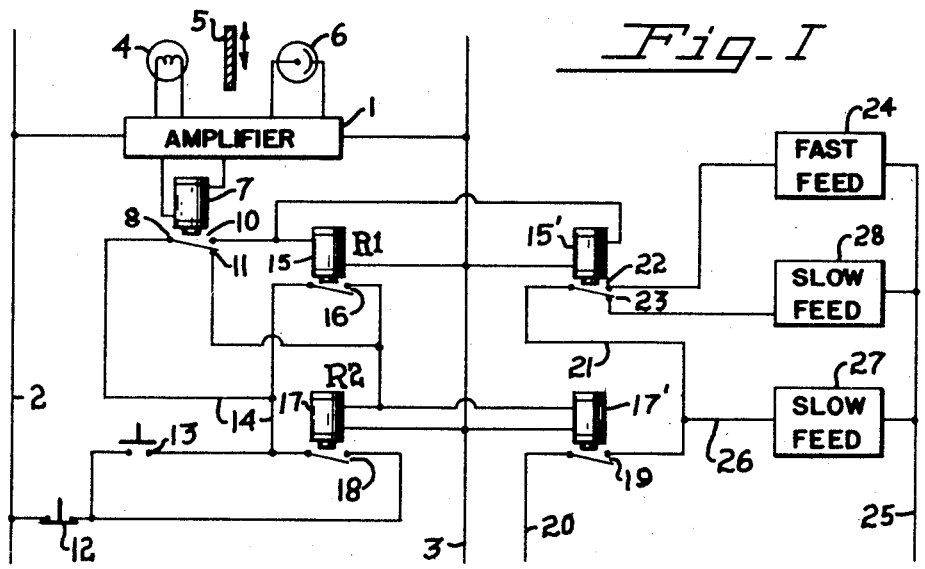
*Fig. I*
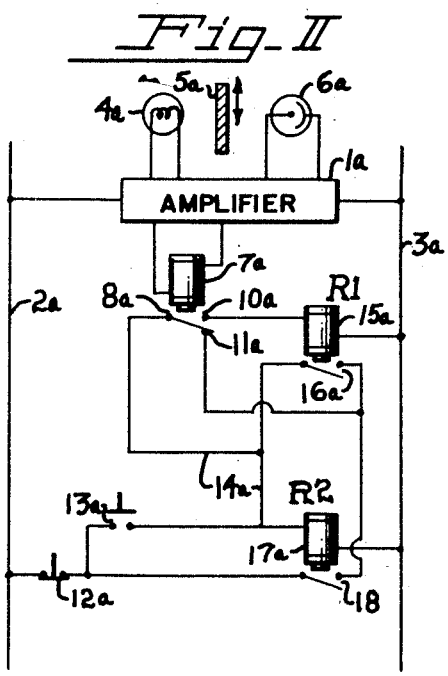
*Fig. II*
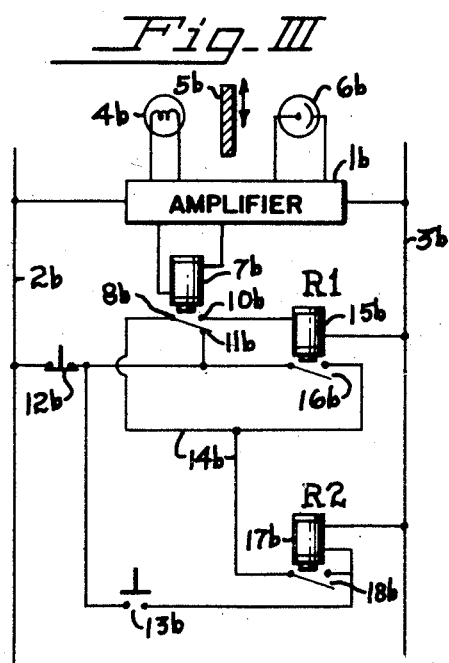
*Fig. III*
Inventor
DONALD B. KENDALL
By Marshall & Marshall
Attorneys Patented May 13, 1952

2,596,900

UNITED STATES PATENT OFFICE 2,596,900

ELECTRICAL RELAY SYSTEM

Donald B. Kendall, Toledo, Ohio, assignor to Toledo Scale Company, Toledo, Ohio, a corporation of New Jersey Application July 9, 1948, Serial No. 37,750

5 Claims. (Cl. 175—320)

This invention relates to control systems and in particular to a combination of a condition responsive switch and a pair of relays for establishing three successive output conditions as a condition under observation changes from a normal condition to an abnormal condition and back to a normal condition.

It is often desirable, particularly when packaging or batching materials by weight, to control the flow of material according to the weight indication of the scale. To secure accurate weights of material in minimum lengths of time it is desirable to feed the material rapidly until the correct weight is approached and to then feed the remaining material at a much slower rate to ensure accurate cut-off of the material when the desired weight is reached. While such control systems have been used they have all involved a number of relays some of which had complex contact arrangements.

The object of this invention is to provide a control system having the desired operating characteristics and having a minimum of relays and contacts.

Another object of the invention is to arrange the relays and contacts to carry out more or less of the predetermined sequence of operations depending upon the condition existing when the control is energized.

These and other objects and advantages are apparent from the following description in which reference is made to the accompanying drawings.

In the drawings:

Figure I is a schematic wiring diagram of the improved control system and a feeder system controlled by the control system.

Figure II is a wiring diagram showing a slightly different arrangement of the control elements.

Figure III is another wiring diagram showing the same elements in a slightly different arrangement.

These specific figures and the accompanying description are intended merely to illustrate the invention and not to impose limitations on the claims.

According to the invention, a condition responsive switch having a first set of contacts that are closed during the existence of normal conditions and a second set of contacts that close as the first set opens and that are closed during the existence of abnormal conditions is employed to control the operation of a pair of relays each of which has a set of normally open contacts (open when the relay is deenergized) in addition to contacts for controlling external circuits. The first of said pair of relays is energized through the first set of contacts of the condition responsive switch and its set of contacts is connected in parallel with the second set of contacts of the condition responsive switch. The sets of contacts of the first and second relays are connected in series to form an energizing circuit for the second relay. A start switch, which may be manually operated, is employed to establish a circuit to one of the relays to place the control in operation.

If the observed condition is normal when the start switch is operated the control establishes itself with both relays energized. When the observed condition changes from normal to abnormal the first of said relays is released while the second is still maintained in its energized condition. Thereafter, when the observed condition changes from abnormal back to normal the second relay is released and the control then remains idle until it is reactivated by operation of the start switch. In the event that the observed condition is abnormal at the moment the start switch is operated the second relay only is energized. Upon a subsequent return of the observed condition to normal the second relay is deenergized in the same manner as if the operation had started initially with the observed condition in its normal state.

When this control is employed with a weighing scale to control the feeding of material to a container on the scale, the condition responsive switch may be photoelectrically actuated, as by means of a photocell amplifier. In this application of the control system the photocell is arranged to be illuminated at the start of a filling operation, to be darkened as a light intercepter mounted on the indicator passes between the photocell and its light source, and to be illuminated again when the light intercepter has passed. Thus the normal conditions exist when the photocell is exposed to its light source and the abnormal conditions exist when the light intercepter shadows the photocell.

The output circuits of the relays are arranged so that the first of the pair of relays controls the rapid flow of material to a container on the scale while the second of the pair of relays controls the slow feed of material. Thus if the start switch is operated when there is an empty container on the scale, the control circuit establishes a fast feed of material to the container and, optionally, may also establish a slow feed of material. When the indicator or light intercepter reaches the photocell, indicating the close approach to the desired weight, the first relay controlling the high speed feeder is de-energized to stop that feed and the slow feeder is then started or continued in operation depending upon its circuit arrangement. When the light intercepter passes the light beam, thus indicating that the correct weight has been reached, the second relay is de-energized to stop the slow feeder, thus cutting off all flow of material to the container on the scale.

Referring now to the accompanying drawings, in particular Figure I, a photoelectric amplifier 1 is shown connected between power supply leads 2 and 3. The photoamplifier 1 supplies power to a light source bulb 4, which in cooperation with an interceptor 5, is arranged to control the illumination of a photocell 6 according to the condition of the weighing device. The photocell 6 is connected to the photoamplifier 1. The photoamplifier 1 feeds current to a relay coil 7 adapted to operate a first set of contacts 8—10 that are closed during the existence of normal conditions and which for convenience may be referred to as "eye light" contacts. This relay also includes a second set of contacts 8—11 which, being closed during abnormal conditions, may be known as "eye dark" contacts. Thus the relay in the photoamplifier 1 including its contacts 8—10 and 8—11 constitutes a condition responsive switch having a normally open set of contacts and a normally closed set of contacts.

Starting with normal conditions such that the condition responsive switch contacts 8—10 are closed and assuming the control circuit to be de-energized, the circuit is brought to operative condition by current flowing through a normally closed stop switch 12, a start switch 13 that is closed to initiate a cycle of operations, a lead 14, the now closed contacts 8—10 of the condition responsive switch, and an operating coil 15 of an R1 relay. The other terminal of the operating coil 15 is connected to the other power lead 3. As soon as the R1 relay closes its R1 contacts 16 current flows from the start switch 13 through the now closed R1 contacts 16 and an operating coil 17 of an R2 relay the other side of which is connected to the power lead 3. When the R2 relay operates, it closes its contacts 18 to complete a holding circuit around the start switch 13 so that the latter may now be released without de-energizing the relays. The second set of contacts 8—11 of the condition responsive switch are connected in parallel with the R1 contacts 16.

The R2 relay, or an auxiliary relay 17', is provided with load circuit contacts 19 which, when the relay is operated, connect a power lead 20 to an intermediate terminal 21. The R1 relay, or an auxiliary relay 15', has normally open contacts 22 and normally closed contacts 23 one side of each of which is connected to the intermediate terminal 21. When both relays are energized current may flow from the power lead 20 through the R2 contacts 19, the intermediate terminal 21, the R1 contacts 22, a fast speed feeder 24, and a return power lead 25. During this time current may also flow from the intermediate terminal 21 through a lead 26 and a slow speed feeder 27 to the power lead 25. In this arrangement both the fast speed feeder 24 and the slow speed feeder 27 are energized when both relays are closed. If it is desired to operate only the high speed feeder 24 during this interval a slow speed feeder 28 energized through the normally closed R1 contacts 23 may be substituted for the slow speed feeder 27. Since the R1 contacts 23 are opened when the relay is energized, the slow speed feeder 28 will be de-energized when the R1 relay coil 15 is energized.

When the conditions change from normal to abnormal, as by the interception of the light beam by the scale indicator, the condition responsive switch opens its contacts 8—10 and, within the operating time of the relays, closes its second set of contacts 8—11 thereby cutting off the flow of current to the R1 relay coil 15 and establishing a by-pass circuit around the R1 contacts 16 so that the R2 relay is now held by current flowing through its holding contacts 18 and the "eye dark" contacts 8—11 of the condition responsive switch. Under this condition the R2 relay coil 17' only is energized so that the high speed feeder 24 is stopped and the slow speed feeder 28 is energized. If the other option were taken, i. e. using the slow speed feeder 27 instead of the feeder 28, the feeder would have been operating in parallel with the high speed feeder 24 and would now continue to operate even though the high speed feeder had stopped.

When the observed condition returns to normal, as by the indicator uncovering the photocell, the condition responsive switch opens its "eye dark" contacts 8—11 and closes its "eye light" contacts 8—10, thereby cutting off the flow of current to the operating coil 17 of the R2 relay. At this time the R2 relay is de-energized and it thereupon opens its holding contacts 18 to prevent the re-energization of the R1 relay coil 15. There may be a momentary flow of current through the operating coil 15 of the R1 relay before the R2 holding contacts 18 open but this current flow is not sufficient to operate the relay to reclose its contacts 16 before the R2 holding contacts 18 open. When the R2 relay is de-energized it opens its load contacts 19 and thereby de-energizes the circuits feeding the feeders so that none of them may operate.

In this circuit there is a condition responsive switch having a first set of contacts that are closed during the existence of normal conditions—the contacts 8—10; a second set of contacts that are closed during the existence of abnormal conditions—the contacts 8—11; a first relay that is energized through the first of said sets of contacts, said first relay having relay contacts connected in parallel with the second set of contacts on the condition responsive switch—the contacts 16; and a second relay—the relay 17 having a holding contact—the contact 18—connected in series with the relay contacts of the first relay to establish a circuit for the second relay. A switch—the start switch 13—by by-passing the holding contacts 18 establishes a circuit to one of the relays for energizing the control.

The arrangement of the control elements for controlling the operation of the R1 and R2 relays may be changed without varying the cycle of operations or the performance of the control. One such variation is shown in Figure II. The operation of this circuit may be traced by following current flow from a power lead 2a through a normally closed stop switch 12a, a start switch 13a, a lead 14a, the now closed contacts 8a—10a of the condition responsive switch (normal conditions being assumed) and through the operating coil 15a of an R1 relay. The other side of the operating coil 15a of the relay 15a is connected to the return power lead 3a. When the R1 relay operates, it closes its R1 contacts 10a, thus closing a by-pass circuit around contacts 8a—11a of the condition responsive switch. When the lead 14a was energized by closing the start switch 13a current also flowed through an operating coil 17a of an R2 relay the other side of which is connected to the return power lead 3a. The closure of the R2 relay closes its holding contacts 18a which contacts being in series with the R1 contacts 16a establish a holding circuit around the start switch 13a to maintain current flow to the operating coils 15a and 17a of the relays after the start switch 13a is released. Thus a closure of the start switch 13a during the existence of normal conditions results in the closure of both relays to establish the same load circuit conditions as obtained in the same portion of the cycle of the control circuit shown in Figure I.

When the observed conditions change from normal to abnormal, such as occurs when the photoelectric cell 6a is darkened, the condition responsive switch closes its contacts 8a—11a as it opens its contacts 8a—10a, thus establishing a shunt around the R1 contacts 16a while these contacts are being opened by the release of the R1 relay. Thus the control shifts from a state in which both relays are energized to a state in which the relay coil 17a only is energized as the observed condition changes from normal to abnormal. This operation is identical with a similar change occurring in the previously described circuit.

When the observed condition returns to normal, the condition responsive switch opens its contacts 8a—11a and closes its contacts 8a—10a. The opening of the contacts 8a—11a breaks the holding circuit to the R2 relay coil 17a so that the R2 relay now releases, thereby opening its holding contacts 18a. There is no possibility whatsoever for the R1 relay coil 15a to be energized at this point because the condition responsive switch contacts 8a—11a break the circuit as or slightly before the condition responsive switch contacts 8a—10a close and, therefore, there is no possibility of current flow to the operating coil 15a of the R1 relay.

In this example, as in the previous example, a condition responsive switch having two sets of contacts and two relays each having a set of relay contacts are employed. In each example, the R1 relay coils 15 or 15a is energized through a first set of contacts of the condition responsive switch, the contacts of the R1 relay are in parallel with the second set of contacts of the condition responsive switch and the relay contacts of the two relays are connected in series to provide a holding circuit to the second relay. As far as external operation is concerned, the circuits are identical. Furthermore, they employ exactly the same elements, the only difference being a slight rearrangement.

These elements may be arranged in a slightly different fashion and still accomplish identically similar results. Thus the operation of a third example shown in Figure III may be followed by tracing the current flow from a supply lead 2b, through a normally closed stop switch 12b, a start switch 13b, and an operating coil 17b of an R2 relay the other side of which operating coil is connected to the return lead 3b. As soon as this relay closes it closes its R2 contacts 18b so that current may flow from the start switch 13b through the contacts 18b to a lead 14b and from this lead through now closed contacts 8b—10b of the condition responsive switch to an operating coil 15b of an R1 relay. The other side of the R1 operating coil is connected to the return lead 3b. When the R1 relay closes it closes its contacts 16b which establish a shunt circuit around the now open contacts 8b—11b of the condition responsive switch which circuit, in series relation with the contacts 18b of the R2 relay, establishes a circuit around the start switch 13b so that the latter may now be released without de-energizing the relays.

Thus, assuming normal conditions, and operation of the start switch 13b results in energizing both relays and establishing a holding circuit for the relays. When the observed conditions change from normal to abnormal the condition responsive switch opens its normally closed contacts 8b—10b as it closes its normally open contacts 8b—11b to establish a by-pass circuit around the R1 contacts 16b and thus maintain the holding circuit for the R2 relay as the R1 relay releases. Later, when the observed condition returns to normal, the condition responsive switch opens its contacts 8b—11b and recloses its contacts 8b—10b. However, the opening of the contacts 8b—11b breaks the holding circuit around the start switch 13b and the immediate reclosure of the normally closed contacts 8b—10b has no further effect and the R1 and R2 relays are both de-energized.

It will be observed that in this example the sequence of operation of the relays are substantially identical the only difference occurring in the sequence upon operation of the start switch 13b since in this third example the R2 relay must close before power may be supplied to the R1 relay coil 15b. The sequence of operation as the observed condition changes from normal to abnormal and back to normal is identical with the sequence of operations in the other examples.

In this third example it will be noticed that the R1 relay coil 15b is energized through the normally closed contacts 8b—10b of the condition responsive switch in exactly the same manner as the R1 relay is energized in the other examples. Likewise in this example the contacts of the R1 relay are connected in parallel with the normally open contacts of the condition responsive switch. Likewise, the R1 contacts and the R2 contacts are connected in series to supply the holding circuit for the R2 relay coil 17b. Thus, in all essential detail the examples are identical.

The last two examples in some respects are preferable to the first example in that if a break-before-make condition responsive switch is used there is no possibility of re-energizing either of the relays at the end of the sequence of operations when the observed condition changes from abnormal back to normal. This follows because in each of these examples the R1 relay is energized either through its own contacts or the normally open contacts 8a—11a or 8b—11b of the condition responsive switch so that when the contacts 8a—11a or 8b—11b open with the R1 relay de-energized both relays are positively de-energized and there is, therefore, no possibility of re-energization of either relay.

These examples illustrate circuit arrangements for obtaining the desired control characteristics and in each a minimum of control elements is employed, namely, a condition responsive switch having two sets of contacts which incidentally may be combined as a single-pole double-throw switch, and two relays each of which has a single set of contacts employed in the control of the relays. In each of the circuits the normal sequence of operations is accurately continued even though the start switch 13 should be closed during the existence of abnormal conditions. In this latter event the R2 relay only is energized and its holding circuit is automatically completed to set up the required circuit condition. Thus this control system, employing a minimum of elements, provides reliable operation for establishing three different output conditions (two circuits closed, one circuit closed, or both circuits open) in response to the momentary starting contact and the change of an observed condition from a normal condition to an abnormal condition and back to normal.

Having described the invention, I claim:

1. In a control circuit, in combination, a switch that is actuated by condition responsive means, said switch having a first and a second set of contacts each of which opens as the other closes, a first relay, a first set of relay contacts on the first relay that are closed by energization of the relay, a second relay, a second set of relay contacts on the second relay that are closed by energization of the second relay, a power lead, a power return lead, and a start switch, said first and second sets of relay contacts and said second relay being connected in a series circuit between said power and power return leads, said second set of switch contacts being connected in parallel with the first set of relay contacts, said start switch being connected from the power lead to a point in the series circuit intermediate the power lead and the second relay to parallel at least the second set of relay contacts, and said first relay and the first set of switch contacts being connected in series between the power return lead and a point in the series circuit to parallel at least the second relay.

2. In a control circuit, in combination, a switch that is actuated by condition responsive means, said switch having a first and a second set of contacts each of which opens as the other closes, a first relay, a first set of relay contacts on the first relay that are closed by energization of the relay, a second relay, a second set of relay contacts on the second relay that are closed by energization of the second relay, a power lead, a power return lead and a start switch, said second relay being connected to the power return lead, said first and second sets of relay contacts being connected in a series circuit between said power lead and the second relay, said second set of switch contacts being connected in parallel with the first set of relay contacts, said start switch being connected from the power lead to a point in the series circuit to parallel at least the second set of relay contacts, and said first relay and the first set of switch contacts being connected in series between the power return lead and a point in the series circuit to parallel at least the second relay.

3. In a control circuit, in combination, a switch that is actuated by condition responsive means, said switch having a first and a second set of contacts each of which opens as the other closes, a first relay, a first set of relay contacts on the first relay that are closed by energization of the relay, a second relay, a second set of relay contacts on the second relay that are closed by energization of the relay, a power lead, a power return lead and a start switch, said relays being each connected to the power return lead, said first and second sets of relay contacts being connected in a series circuit between said power lead and the second relay, said second set of switch contacts being connected in parallel with the first set of relay contacts, said start switch being connected from the power lead to the series circuit to parallel at least the second set of relay contacts, and said first set of switch contacts being connected between the first relay and a point of said series circuit that is connected to the second set of switch contacts.

4. In a control circuit, in combination, a switch that is actuated by a condition responsive means, said switch having a first and a second set of contacts each of which opens as the other closes, a first relay, a first set of contacts on the first relay to be closed by energization of the relay, a second relay, a second set of contacts on the second relay to be closed by energization of the second relay, a start switch, and power supply and power return leads, said first and second sets of relay contacts and the second relay being connected in a series circuit with the second set of relay contacts connected to the power supply lead and the relay connected to the power return lead, said second set of switch contacts being connected in parallel with the first set of relay contacts, said start switch being connected from the power lead to a point in the series circuit to parallel at least the second set of relay contacts, and said first set of switch contacts and said first relay being connected in series between a contact of the second set of switch contacts and the power return lead.

5. A control circuit according to claim 4, in which the start switch is in parallel with the second set of relay contacts.

DONALD B. KENDALL.

REFERENCES CITED

The following references are of record in the file of this patent:

UNITED STATES PATENTS

| Number | Name | Date |
| --- | --- | --- |
| 1,893,223 | Burkle | Jan. 3, 1933 |
| 2,375,229 | Klemperer | May 8, 1945 |
| 2,445,450 | Narbutovskih | July 20, 1948 |
| 2,446,216 | Dodd | Aug. 3, 1948 |
| 2,454,161 | Hall | Nov. 16, 1948 |